United States Patent Office 3,409,596
Patented Nov. 5, 1968

3,409,596
POLYAMIDES FROM DIAMINO DIARYL DISULFONIC ACIDS OR SALTS THEREOF
Otto Unger and Günther Nawrath, Dormagen, and Günther Nischk, Leverkusen, Germany, assignors to Farbenfabriken Bayer Aktiengesellschaft, Leverkusen, Germany, a corporation of Germany
No Drawing. Filed Jan. 12, 1965, Ser. No. 425,072
Claims priority, application Germany, Feb. 8, 1964,
F 41,969
9 Claims. (Cl. 260—78)

ABSTRACT OF THE DISCLOSURE

Condensation of 4,4'-diamino-2,2'diaryl- or -diarylalkane- -disulfonic acid or salt with alkylene dicarboxylic acid or salt in the presence of a polyamide-forming material such as a lactam or salt of diamine and dicarboxylic acid, at a temperature between about 250–300° C., in which such disulfonic acid or salt is present in an amount between about 0.1–20% by weight of the polyamide-forming material, to form the corresponding sulfonic acid group-containing melt-spinnable polyamide; and filaments, fibers and threads produced by meltspinning such polyamide.

---

This invention relates to threads, filaments and fibres from polyamides containing sulfonic acid groups linked to an aromatic nucleus and to their manufacture.

In the polycondensation of ammonium salts of diamines with dicarboxylic acids or in the polymerisation of lactams, more or less high molecular polyamides are produced the water uptake of which at room or elevated temperature depends on the number of C-atoms or hetero atoms in the monomer unit. Thus, for example, the polyamide of hexamethylene diamine and sebacic acid has a lower water-uptake capacity than the polyamide of hexamethylene diamine and adipic acid or caprolactam. The hydrophilic properties may be further increased by incorporating in the molecule ammonium salts which contain hetero atoms such as oxygen. Suitable starting components for this are, for example, the ammonium salts of ether dicarboxylic acid or ether diamines, e.g. γ:γ'-di-(aminopropoxy)-butane(-ethane, -hexane) or the corresponding γ:γ'-(di-carboxypropoxy)-alkylenes.

For dyeability with basic dyestuffs and for increasing the hydrophilic properties, it has also already been proposed to use diamines which are linked to an aromatic nucleus through alkylene groups and in addition contain a sulphonic acid group.

Such compounds include, for example, sodium di-(amino-methyl)-benzene sulphonate. If in the said class of compounds the amino group is directly attached to the benzene nucleus then condensation with dicarboxylic acids in the presene of the usual starting materials which lead to polyamides gives rise to polyamides which are dark brown in colour.

It is an object of this invention to eliminate these disadvantageous results. Accordingly it is a primary object of this invention to provide sulfonic acid group-containing polyamides and a process for their preparation by usng certain diamino-diarylsulphonic acids in which the amino group is directly attached to the aromatic nucleus. The subject of the invention includes therefore a process for the production of threads and fibres which is characterised in that 4:4'-diamino-2:2'-diphenyl disulphonic acid or 4:4' - diamino-2:2'-diphenylalkane disulphonic acids of the formula

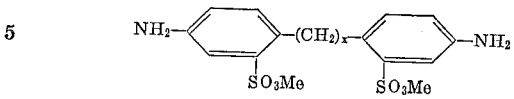

in which x stands for the numbers 0 to 3 and Me denotes hydrogen or an alkali metal, together with approximately equivalent quantities of alkylene dicarboxylic acids or their alkali metal salts are added in quantities of about 0.1 to 20% by weight, preferably 2 to 10%, to polyamide-forming starting materials such as lactams or salts of diamines and dicarboxylic acids, and the resulting polyamides are spun from the melt to form fibres or threads.

These polyamides contain up to 20 percent of a recurring unit of the formula

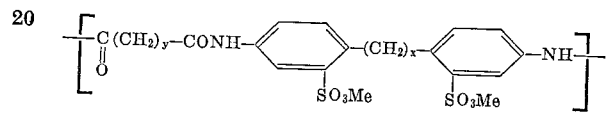

wherein Me is a member of the group consisting of hydrogen and an alkali metal, x denotes a whole number from 0 to 3 and y a whole number from 4 to 9.

Examples of diaminosulphonic acids suitable for the process of the invention are 4:4'-diamino-2:2'diphenyl-disulphonic acid, 4:4' - diamino - 2:2'-dibenzyldisulphonic acid, 4:4'-diamino-2:2'-diphenylpropane disulphonic acid and 4:4' - diamino-2-diphenylsulphonic acid. These compounds are present as inner ammonium salts. In the polycondensation of starting materials which form polyamides, either these inner ammonium salts are used in combination with dialkali metal salts of dicarboxylic acids or the inner ammonium salts of the sulphonic acids are converted into the corresponding alkali metal salts and condensed in the presence of free dicarboxylic acid. Suitable dicarboxylic acids and their corresponding alkali metal salts include succinic acid, adipic acid, suberc and sebacic acid and their alkali metal salts. To obtain high molecular weght polymeric polyamides which be spun well, it is advisable to use the sulphonic group-containing diamines with the equivalent quantity of dicarboxylic acid or of its alkali metal salts.

For the process of polycondensation, the above mentioned inner ammonium salts or their alkali salts are added in combination with a corresponding quantity of dicarboxylic acid or alkali metal salts to the known starting mateirals for the preparation of polyamide in quantities of 0.1 to 20%. The addition itself may be carried out by adding the sulphonic acid group-containing diamines with the dicarboxylic acid in solid from or, and this is especially advantageous, by adding the equivalent quantity of the inner ammonium salts or corresponding alkali metal salts and the dicarboxylic acids or their salts in aqueous solution. This results in the monomers being finely divided in the polyamide melt. On heating, these mixtures soon become clear, incorporation into the polyamide by condensation occurring at the same time.

As starting materials for the known polyamides into which the above-mentioned sulphonic acid group-containing diamines are incorporated by condensation, there may be used lactams such as caprolactam, ω-aminocarboxylic acids such as ε-aminocaproic acid, 11-aminoundecanoic acid and the diammonium salts of alkylene diamine with aliphatic dicarboxylic acids, such as those of tetra-, hexa- or octamethylene diamine with glutaric acid, adipic acid, pimelic acid, suberic acid, azelaic acid and sebacic acid.

The condensation itself is carried out at temperatures above the melting points of the polyamides, preferably between 250 and 300° C. If condensation is not carried out under pressure, it is advisable to conduct inert gases such as carbon dioxide or nitrogen over the melt. When caprolactam is used as starting material it is also advisable to carry out an extraction with water before the melt spinning in order to remove monomeric lactam. The resulting polyamides containing sulphonic acid groups are obtained in a colourless form and can be converted by known methods of melt spinning into threads and fibres. Owing to their stronger hydrophilic character, they have the capacity to bind more water than the unmodified starting polyamides. In addition, when using the above mentioned diamines containing sulphonic acid groups, they are stable to light.

It is surprising that the sulphonic acid group-containing diamines used according to the invention can be incorporated into the polyamides by condensation easily and without discolouration although they contain aromatically bound amino groups. If, on the other hand, for example, an alkyl- or alkoxy group is present in the aromatic phenyl nucleus, fairly strong discolouration occurs already at the stage of condensation. The same applies to those diamino-diarylsulphonic acids of the above constitution in which the sulphonic acid groups are in the 3-position.

Example 1

3.04 parts of potassium 4:4' - diamino-2:2'-dibenzyl-disulphonate are heated with 0.96 part of adipic acid, 10 parts of ε-aminocaproic acid and 186 parts of caprolactam for 30 minutes at 250° C. while the reaction mixture is stirred and nitrogen is passed over, and then for 5 hours at 300° C. A highly viscous, colourless melt is produced. After disintegrating the melt, the pieces are extracted with water. After drying, the pieces have a moisture content of 0.061%, a relative viscosity of 3.20 and a flow point of 220 to 221° C.

The threads obtained from the above pieces have good hydrophilic properties and affinity to basic dyestuffs; the spinning temperature is about 270° C.; rate of drawing off: 600 m./min.

The reaction components given in Table 1 are treated in accordance with the procedure of Example 1 to provide the following data:

TABLE 1

| Parts | Viscosity of the melt in poises | Rel. | Inclination in percent | $H_2O$ content of the pieces in percent | M.P. |
|---|---|---|---|---|---|
| 7.6 Potassium 4:4'-diamino-2:2'-dibenzyl-disulphonate<br>2.4 Adipic acid<br>10.0 ε-Aminocaproic acid<br>180.0 Caprolactam | 3 330 | 2.69 | +9.3 | 0.069 | 218–219 |
| 15.2 Potassium 4:4'-diamino-2:2'-dibenzyl-disulphonate<br>4.8 Adipic acid<br>10.0 ε-Aminocaproic acid<br>170.0 Caprolactam | 3 030 | 2.58 | −9.6 | 0.081 | 212–213 |
| 7.4 Sodium 4:4'-diamino-2:2'-dibenzyl-disulphonate<br>2.6 Adipic acid<br>20.0 ε-Aminocaproic acid<br>170.0 Caprolactam | 2 860 | 2.68 | +1.0 | 0.081 | 214–217 |
| 3.04 Potassium 4:4'-diamino-2:2'-dibenzyl-disulphonate<br>0.96 Adipic acid<br>10.00 ε-Aminocaproic acid<br>186.00 Caprolactam | 10 300 | 3.20 | −12.3 | 0.061 | 220–221 |

Example 2

1.5 parts of potassium adipate dissolved in a little water is added to a mixture consisting of 2.5 parts of 4:4'-diamino-2:2'-dibenzyl-disulphonic acid, 10 parts of ε-aminocaproic acid and 186 parts of caprolactam. Pure nitrogen is passed over the mixture and at the same time the mixture stirred and heated for 30 minutes at 250° C. and then for 5 hours at 300° C., a highly viscous, colourless melt being thereby produced. The melt is broken up and the small pieces are extracted with water to remove the monomer. After drying, the pieces have a moisture content of 0.016%, a viscosity of 3.26 and a flow point of 220 to 225° C.

The threads obtained from the shavings by melt spinning have good affinity to basic dyestuffs and hydrophilia; the spinning temperature is in the region of 270° C.; rate of drawing off 600 m./min.

The experiments shown in Table 2 are carried out according to the above method.

TABLE 2

| Parts | Viscosity of the melt in poises | Rel. | Inclination in percent | $H_2O$ content of the pieces in percent | M.P. |
|---|---|---|---|---|---|
| 2.50 4:4'-diamino-2:2'-dibenzyldisulphonic acid<br>1.50 Potassium adipate<br>10.00 ε-Aminocaproic acid<br>186.00 Caprolactam | 20 200 | 3.26 | +30.8 | 0.016 | 222–225 |
| 6.25 4:4'-diamino-2:2'-dibenzyldisulphonic acid<br>3.75 Potassium adipate<br>10.00 ε-Aminocaproic acid<br>180.00 Caprolactam | 1 860 | 2.54 | +11.8 | 0.074 | 216–218 |
| 12.50 4:4'-diamino-2:2'-dibenzyldisulphonic acid<br>7.50 Potassium adipate<br>10.00 ε-Aminocaproic acid<br>170.00 Caprolactam | 837 | 2.19 | +12.5 | 0.073 | 206–209 |

Example 3

The mixture consisting of 3.53 parts of lithium 4:4'-diamino-2:2'-diphenyl-disulphate, 1.47 parts of adipic acid, 10 parts of ε-aminocaproic acid and 185 parts of caprolactam are heated for 30 minutes at 250° C. while nitrogen is passed over and the mixture stirred, and then for 5 hours at 300° C., a highly viscous, colourless melt being produced. After disintegration of the melt, the monomer is extracted from the small pieces with water; the pieces are then dried. At a moisture content of 0.01%, these pieces have a viscosity of 2.91 and flow point of 219–220° C.

The threads obtained from these pieces by melt spinning have good affinity to basic dyestuffs as well as good hydrophilic properties; the spinning temperature lies at 270° C.; rate of drawing off: 600 m./min.

Polycondensations carried out in accordance with the procedure of Example 3 give rise to polyamides with the data given in Table 3.

TABLE 3

| Parts | Viscosity of the melt in poises | Rel. | Inclination in percent | H₂O content of the pieces in percent | M.P. |
|---|---|---|---|---|---|
| 3.53 Lithium 4:4'-diamino-2:2'-diphenyl-disulphonate<br>1.47 Adipic acid<br>10.00 ε-Aminocaproic acid<br>185.00 Caprolactam | 4 140 c | 2.91 | +10.00 | 0.10 | 219–220 |
| 7.04 Lithium-4:4'-diamino-2:2'-diphenyl-disulphonate<br>2.96 Adipic acid<br>10.00 ε-Aminocaproic acid<br>180.00 Caprolactam | 2 160 | 2.41 | +46.18 | 0.018 | 215–218 |
| 13.67 Lithium 4:4'-diamino-2:2'-diphenyl-disulphonate<br>6.33 Adipic acid<br>10.00 ε-Aminocaproic acid<br>170.00 Caprolactam | 785 | 2.02 | +12.70 | 0.070 | 208–210 |

Example 4

A mixture consisting of 2.75 parts of 4:4'-diamino-2:2'-diphenyl-disulphonic acid, 1.25 parts of lithium adipate, 10 parts of ε-aminocaproic acid and 186 parts of caprolactam is heated for 30 minutes at 250° C. while nitrogen is passed over and the mixture stirred, and then for 5 hours at 300° C. The melt is viscous and colourless. The melt is converted into small pieces and these are freed from monomer by extraction with water. After drying, the pieces have a moisture content of 0.01% and a viscosity of 2.91 and a flow point of 219–220° C.

The threads spun from the pieces by melt spinning have good affinity to basic dyestuffs and good hydrophilic properties; the spinning temperature is about 280° C.; rate of drawing off: 600 m./min.

Polycondensations carried out in accordance with the procedure of Example 4 lead to polyamides having the data given in Table 4.

2. Polyamide having 0.1 to 20 percent of a recurring unit of the formula

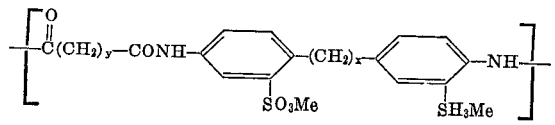

wherein Me is a member of the group consisting of hydrogen and an alkali metal, $x$ denotes a whole number from 0 to 3, and $y$ a whole number from 4 to 9.

3. Polyamide having 0.1 to 20 percent of a recurring unit of the formula $$-\left[\overset{O}{\underset{\|}{C}}(CH_2)_y-CONH-\underset{SO_3Me}{\underbrace{\phantom{XX}}}-\underset{SO_3Me}{\underbrace{\phantom{XX}}}-NH-\right]-$$

wherein Me is a member of the group consisting of hydrogen and an alkali metal and $y$ denotes a whole number from 4 to 9, produced by condensing at a temperature between about 250–300° C., a 4,4'-diamino-2,2'-diarylidisulfonic acid of the formula $$NH_2-\underset{SO_3Me}{\underbrace{\phantom{XX}}}-\underset{SO_3Me}{\underbrace{\phantom{XX}}}-NH_2$$

wherein Me is a member of the group consisting of

TABLE 4

| Parts | Viscosity of the melt in poises | Rel. | Inclination in percent | H₂O content of the pieces in percent | M.P. |
|---|---|---|---|---|---|
| 2.75 4:4'-diamino-2:2'-diphenyldisulphonic acid<br>1.25 Lithium adipate<br>10.00 ε-Aminocaproic acid<br>186.00 Caprolactam | 5 950 | 3.19 | +17.6 | 0.086 | 219–222 |
| 6.87 4:4'-diamino-2:2'-diphenyldisulphonic acid<br>3.13 Lithium adipate<br>10.00 ε-Aminocaproic acid<br>180.00 Caprolactam | 1 820 | 2.59 | −4.9 | 0.093 | 216–218 |
| 13.75 4:4'-diamino-2:2'-diphenyldisulphonic acid<br>6.25 Lithium adipate<br>10.00 ε-Aminocaproic acid<br>170.00 Caprolactam | 1 120 | 2.06 | +4.5 | 0.103 | 210 |

What we claim is:

1. A filament of a polyamide having 0.1 to 20 percent of a recurring unit of the formula

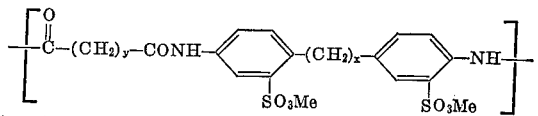

wherein Me is a member of the group consisting of hydrogen and an alkali metal, $x$ denotes a whole number from 0 to 3, and $y$ a whole number from 4 to 9.

hydrogen and an alkali metal with an alkylene dicarboxylic acid having 4 to 9 carbon atoms in the alkylene moiety in the presence of a polyamide-forming material selected from the group consisting of a lactam and a salt of a diamine and a dicarboxylic acid, the amount of the diaminediaryl-disulfonic acid being in the range of 0.1–20% by weight of the polyamide-forming material.

4. Polyamide having 0.1 to 20 percent of a recurring unit selected from the group consisting of those having the formulae

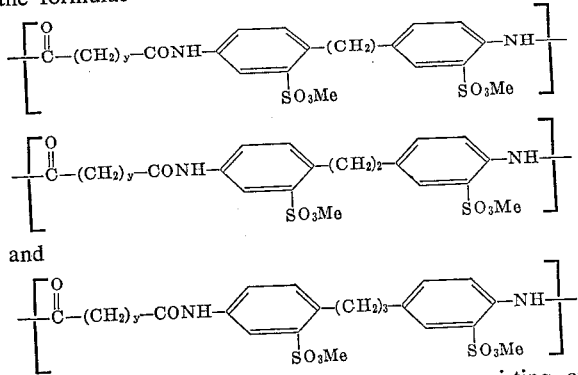

and wherein Me is a member of the group consisting of hydrogen and an alkali metal and $y$ is a whole number from 4 to 9, produced by condensing at a temperature between about 250–300° C., a 4,4′-diamino-2,2′-diaryl-disulfonic acid of the formula

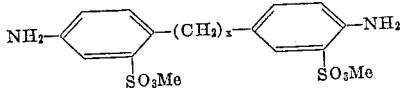

wherein Me is a member of the group consisting of hydrogen and an alkali metal and $x$ represents a whole number from 0 to 3 with an alkylene dicarboxylic acid having 4 to 9 carbon atoms in the alkylene moiety in the presence of a polyamide-forming material selected from the group consisting of a lactam and a salt of a diamine and a dicarboxylic acid, the amount of the diaminediaryl-disulfonic acid being in the range of 0.1–20% by weight of the polyamide-forming material.

5. Process for the production of filaments, threads and fibres from polyamides, having sulfonic acid groups, which comprises meltspinning a polyamide prepared by condensing at a temperature between about 250–300° C. a 4,4′-diamino-2,2′-diaryl-disulfonic acid of the formula

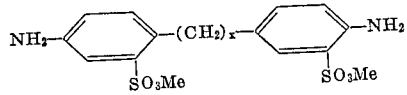

wherein Me is a member of the group consisting of hydrogen and an alkali metal and $x$ represents a whole number from 0 to 3 with an alkylene dicarboxylic acid in the presence of a polyamide-forming material selected from the group consisting of a lactam and a salt of a diamine and a dicarboxylic acid, the amount of the diaminodiaryldisulfonic acid being in the range of 0.1 to 20 percent by weight of the polyamide-forming material to form such filaments, fibres and threads.

6. Process according to claim 5, wherein said alkylene dicarboxylic acid is used in the form of its alkali metal salt, and Me is hydrogen.

7. Process according to claim 5 wherein caprolactam is used as polyamide-forming material and the resulting polyamide is extracted with water before meltspinning.

8. Process for the production of polyamides, having sulfonic acid groups, which comprises condensing at a temperature between about 250–300° C. a 4,4′-diamino-2,2′-diaryl-disulfonic acid of the formula

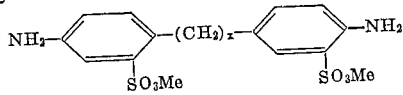

wherein Me is a member of the group consisting of hydrogen and an alkali metal and $x$ represents a whole number from 0 to 3 with an alkylene dicarboxylic acid having 4 to 9 carbon atoms in the alkylene moiety in the presence of a polyamide-forming material selected from the group consisting of a lactam and a salt of a diamine and a dicarboxylic acid, the amount of the diaminodiaryl-disulfonic acid being in the range of 0.1 to 20 percent by weight of the polyamide-forming material, and recovering the polyamide product thereby removed.

9. Process according to claim 8 wherein said alkylene dicarboxylic acid is used in the form of its alkali metal salt, and Me is hydrogen.

References Cited

UNITED STATES PATENTS

| | | | |
|---|---|---|---|
| 3,039,990 | 6/1962 | Huffman | 260—78 |
| 3,142,662 | 7/1964 | Huffman | 260—78 |
| 3,184,436 | 5/1965 | Magat | 260—78 |
| 3,296,204 | 1/1967 | Caldwell | 260—78 |

WILLIAM H. SHORT, *Primary Examiner.*

H. D. ANDERSON, *Assistant Examiner.*